US011182766B2

(12) United States Patent
Stickels et al.

(10) Patent No.: US 11,182,766 B2
(45) Date of Patent: Nov. 23, 2021

(54) INITIATING A TRANSACTION BASED ON A REAL-TIME KINEMATICS ASSISTED LOCATION OF A DEVICE

(71) Applicant: Verizon Patent and Licensing Inc., Arlington, VA (US)

(72) Inventors: Charles Forbes Stickels, Milton, GA (US); Ketan Shridhar Adkar, Alpharetta, GA (US); Ira Ramtirth, Atlanta, GA (US); LaQuiesia Wilkins, Powder Springs, GA (US); Vijaya Kosuri, Atlanta, GA (US); Priyanka Reddy Musuku, Cumming, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/362,032

(22) Filed: Mar. 22, 2019

(65) Prior Publication Data
US 2020/0302421 A1    Sep. 24, 2020

(51) Int. Cl.
*G06Q 20/22*        (2012.01)
*G06Q 20/32*        (2012.01)
(Continued)

(52) U.S. Cl.
CPC ........ *G06Q 20/223* (2013.01); *G06Q 20/325* (2013.01); *G06Q 20/3224* (2013.01); *G06Q 20/401* (2013.01); *H04W 4/021* (2013.01)

(58) Field of Classification Search
CPC ............ G06Q 20/223; G06Q 20/3224; G06Q 20/325; G06Q 20/401; H04W 4/021
See application file for complete search history.

(56) References Cited

U.S. PATENT DOCUMENTS

| 2005/0141712 A1* | 6/2005 | Koo ............... G06Q 40/12 380/231 |
| 2012/0109830 A1* | 5/2012 | Vogel ............. G06Q 20/384 705/75 |

(Continued)

OTHER PUBLICATIONS

"Smart Device-Supported BDS/GNSS Real-Time Kinematic Positioning for Sub-Meter-Level Accuracy in Urban Location-Based Services" by Assefa M. Melesse, dated Dec. 21, 2016 https://www.ncbi.nlm.nih.gov/pmc/articles/PMC5191179/ (Year: 2016).*

(Continued)

*Primary Examiner* — Elda G Milef
*Assistant Examiner* — Raven E Zeer

(57) ABSTRACT

A client device can determine, based on global navigation satellite system (GNSS) data received from one or more GNSS satellites, a non-real-time kinematics (RTK) GNSS location of the client device. The client device can determine, based on corrections data received from a reference station, an RTK-assisted GNSS location, of the client device, from the non-RTK GNSS location. The client device can broadcast location information associated with the client device, the location information indicating the RTK-assisted GNSS location of the client device. The client device can receive, from a merchant device, a peer-to-peer connection request, for a peer-to-peer connection between the client device and the merchant device, based on transmitting the location information and based on the RTK-assisted GNSS location of the client device being located within a particular geographic area. The client device and the merchant device can process a transaction via the peer-to-peer connection.

20 Claims, 9 Drawing Sheets

(51) Int. Cl.
*H04W 4/021* (2018.01)
*G06Q 20/40* (2012.01)

(56) References Cited

U.S. PATENT DOCUMENTS

| | | | | |
|---|---|---|---|---|
| 2016/0180325 | A1* | 6/2016 | Davis | G06Q 20/325 |
| | | | | 705/44 |
| 2016/0260301 | A1* | 9/2016 | Miller | G06K 7/0008 |
| 2016/0315923 | A1* | 10/2016 | Riscombe-Burton | |
| | | | | H04L 63/18 |
| 2016/0335637 | A1* | 11/2016 | Deshpande | G06Q 20/3255 |
| 2017/0041786 | A1* | 2/2017 | Li | H04W 4/38 |
| 2017/0200155 | A1* | 7/2017 | Fourez | G06Q 20/385 |
| 2017/0272948 | A1* | 9/2017 | Holtmanns | H04L 51/00 |
| 2017/0295227 | A1* | 10/2017 | Arana | H04W 4/025 |
| 2017/0374690 | A1* | 12/2017 | Maddali | H04W 24/02 |
| 2018/0159856 | A1* | 6/2018 | Gujarathi | H04L 67/10 |
| 2019/0082007 | A1* | 3/2019 | Klarman | H04L 9/0838 |
| 2019/0154837 | A1* | 5/2019 | Noble | G01S 19/04 |
| 2019/0230462 | A1* | 7/2019 | McLarty | H04W 4/02 |

OTHER PUBLICATIONS

"Introduction to Network RTK" by Lambert Wanniger, dated Jun. 11, 2004 http://www.wasoft.de/e/iagwg451/intro/introduction.html (Year: 2004).*

"Towards a Proximity-Aware, Accessible and Personalized Public Digital Terminal An Initial Study" by Mohammed Misbhauddin and Majed Alshamari, IEEE, dated Apr. 2018 https://ieeexplore.ieee.org/document/8593129/ (Year: 2018).*

"Development of a Network RTK Positioning and Gravity-Surveying Application with Gravity Correction Using a Smartphone" by Jinsoo Kim, Youngcheol Lee, Sungyeoul Cha, Chuluong Choi, and Seongkyu Lee, dated Jul. 2013 https://www.ncbi.nlm.nih.gov/pmc/articles/PMC3758627/ (Year: 2013).*

* cited by examiner

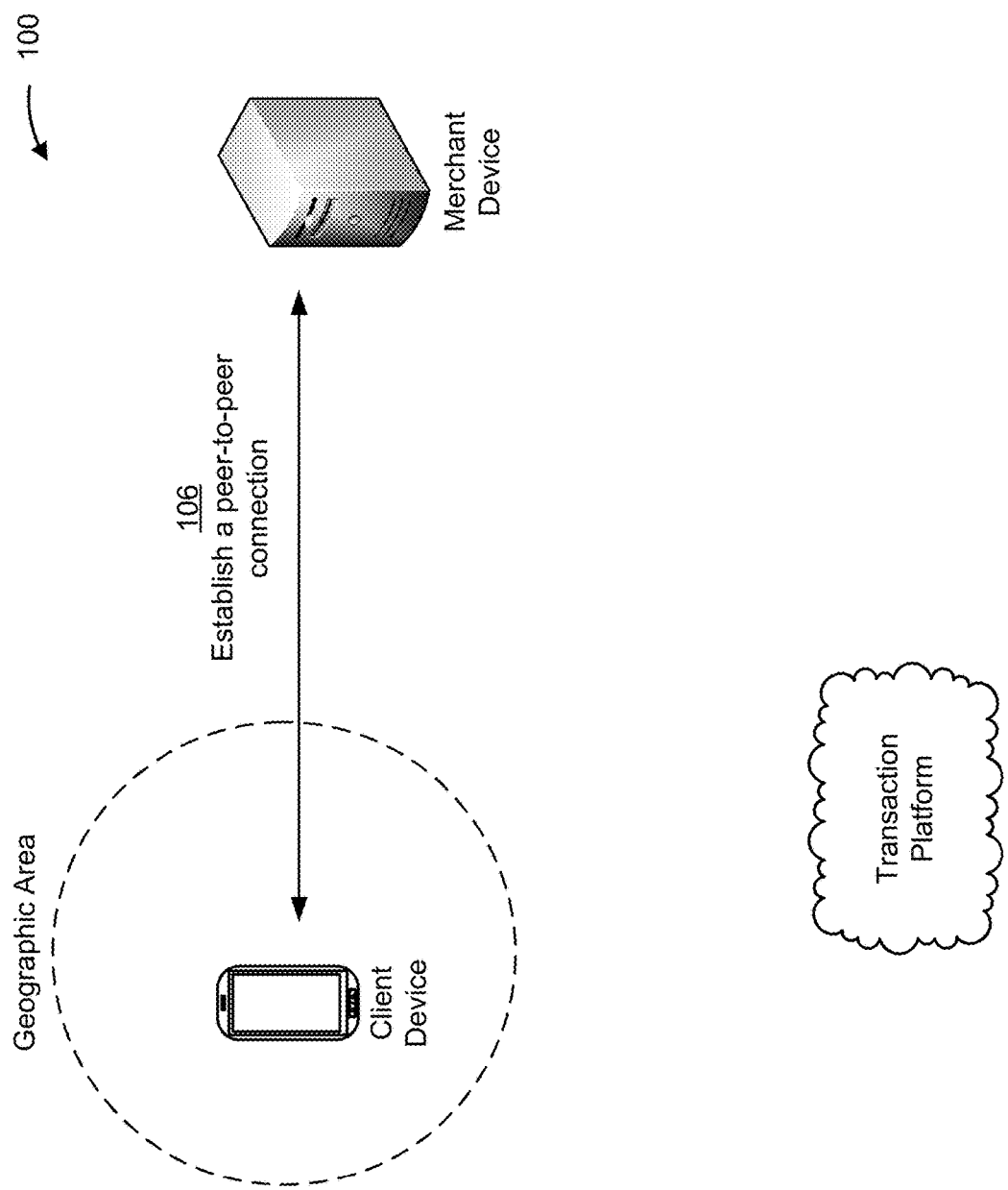

INITIATING A TRANSACTION BASED ON A REAL-TIME KINEMATICS ASSISTED LOCATION OF A DEVICE

BACKGROUND

Global Navigation Satellite System (GNSS) is a term for a satellite navigation system that provides autonomous geospatial positioning with global coverage. The most ubiquitous of these technologies is the Global Positioning System (GPS).

BRIEF DESCRIPTION OF THE DRAWINGS

FIGS. 1A-1F are diagrams of an example implementation described herein.

DETAILED DESCRIPTION OF PREFERRED EMBODIMENTS

Figure 1A:
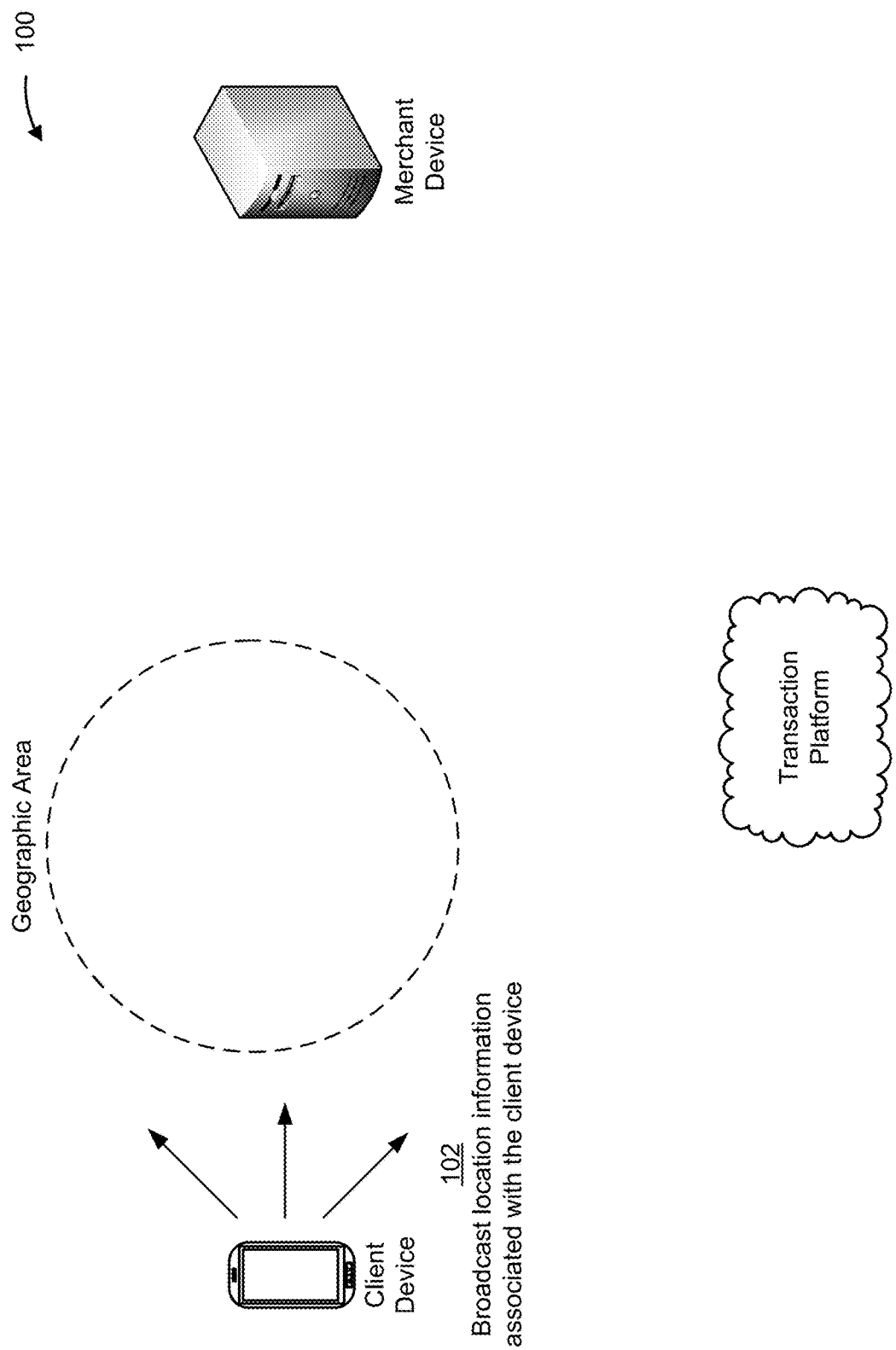

The following detailed description of example implementations refers to the accompanying drawings. The same reference numbers in different drawings can identify the same or similar elements.

A first device and a second device can initiate and process a transaction between the first device and the second device. In some cases, to initiate and process the transaction, the second device might need to identify and locate the first device. For example, the second device can attempt to locate the first device via a connection over a private or public network, such as the Internet, a cellular network and/or the like. In this case, the connection can be via an application associated with the second device, a web portal associated with the second device, and/or the like. However, the transaction can be associated with a merchant location in which many client devices can be located, and the client devices can periodically move around the merchant location, which can result in difficulties in identifying the desired client device with which to initiate and process a transaction (e.g., wasted consumption of memory, processing, and network resources in navigating the web portal or application to identify the desired client device, delays in processing the transaction, and/or the like).

Some implementations, described herein, provide a plurality of devices (e.g., client device and a merchant device) that are capable of initiating a transaction based on real-time kinematics (RTK) assisted global navigation satellite system (GNSS) location. A first device (e.g., a client device) can broadcast location information associated with the first device. A second device (e.g., a merchant device) can determine, based on the location information, that the first device is located within a particular geographic area, and can establish a peer-to-peer connection with the first device based on determining that the first device is located within the geographic area. The first device and the second device can process a transaction, between the first device and the second device, via the peer-to-peer connection. A connection initiated by the second device may be determined as legitimate by the first device via decryption of the data sent using a secret key known by both devices. Legitimate messages can decrypt into expected message formats. In this way, the second device can quickly and accurately identify the first device, and initiate and process the transaction, based on a hyper-accurate RTK-assisted GNSS location. This reduces the overall time duration of the transaction, and reduces the consumption of processing, memory, and networking resources, compared to attempting to locate the first device and initiate and process the transaction via an application or web portal associated with the second device.

FIGS. 1A-1F are diagrams of an example implementation 100 described herein. As shown in FIGS. 1A-1F, example implementation 100 can include a client device, a merchant device, a transaction platform, and/or the like. In some implementations, the client device can be associated with a user, and the merchant device can be associated with a merchant (e.g., a service provider, a goods provider, and/or another type of merchant). In some implementations, the transaction platform can process a transaction between the user and the merchant. The transaction can be associated with a service that is to be provided by the merchant to the user, can be associated with goods that are sold by the merchant and the user, and/or the like. In some implementations, the transaction can include other types of transactions between two or more entities, such as transactions between a first user and a second user and transactions between a first business and a second business, and/or transactions between other types of entities.

In some implementations, the transaction can be initiated based on a location of the client device. For example, the merchant device can monitor a particular geographic area for client devices, and the transaction can be initiated and processed based on the client device entering the geographic area. The geographic area can include an area associated with the merchant (e.g., a drive-through of a restaurant, a refueling pump or charging station of a refueling station, a retail store, and/or the like).

As shown in FIG. 1A, and by reference number 102, the client device can broadcast location information associated with the client device. In some implementations, the client device can periodically broadcast the location information (e.g., at a 500-millisecond interval, at a 2-second interval, and/or the like), can broadcast the location information based on being instructed by the user of the client device to broadcast the location information, and/or the like.

In some implementations, the client device can broadcast the location information using various communications technologies. For example, the client device can broadcast the location information using Bluetooth communications (e.g., a Bluetooth channel), Wi-Fi communications (e.g., a Wi-Fi channel), cellular communications (e.g., via a cellular connection implemented via a cellular network, such as a Long-Term Evolution (LTE) network, a 5G network, and/or the like), and/or the like. In some implementations, when broadcasting the location information using Bluetooth, the client device can broadcast the location information via a Bluetooth low energy (BLE) advertisement channel. A BLE advertisement channel can include a wireless channel that is reserved for a device to broadcast via BLE without having to establish a connection with another device. A device can monitor and/or scan the BLE advertisement channels in order to receive broadcast communications from another device. In some implementations, the client device can broadcast the location information on a particular BLE advertisement channel (e.g., by broadcasting the location information on a default BLE advertisement channel, by broadcasting the location information on a BLE advertisement channel selected by the user, by broadcasting the location information on a BLE advertisement channel specified by the merchant, and/or the like). In some implementations, the client device can cycle through BLE advertisement channels in order to broadcast the location information.

In some implementations, the location information can include information identifying the client device and a location of the client device. The information identifying the client device can include a device name associated with the client device, a medium access control (MAC) address, and/or the like. The information identifying the location of the client device can include a global navigation satellite system (GNSS) location of the client device. The client device can determine the GNSS location based on GNSS data received from one or more GNSS satellites. For example, the client device can determine the GNSS location by determining respective distances between the client device and a plurality of GNSS satellites (e.g., based on the GNSS data) and performing trilateration based on the respective distances and the respective locations of the plurality of satellites.

In some implementations, the location of the client device can include a real-time kinematics (RTK) assisted GNSS location of the client device. RTK allows for GNSS corrections to vastly improve location positioning. RTK leverages a phase of a carrier, without regard to information modulated on the carrier and, as such, can provide greater accuracy than GNSS positioning alone, approaching millimeter precision. RTK relies on fixed and well-surveyed reference stations to transmit corrections data to in-range client devices. Because a given physical station is well-surveyed, an actual position of the reference station is known. A reference station can receive raw satellite data from a group of (e.g., five or more) GNSS satellites, and then generate corrections data as needed to adjust a given satellite's estimated signal location in order to provide a more accurate location. The client device can receive corrections data from a reference station and use the corrections data, in an RTK engine associated with the client device, to make similar adjustments to a non-RTK-assisted GNSS location determined by the client device. In this way, the client device can use the corrections data, along with other observables, to calculate a hyper-accurate location of the client device, which can be a comparatively more accurate and/or precise location as compared to using other GNSS methods (e.g., can be accurate to within centimeters, which might not capable of being provided by non-RTK GNSS systems). The hyper-accurate location of the client device can be specified in a latitude, a longitude, and/or an elevation, and/or another type of coordinate. The hyper-accurate location of the client device can be particularly useful in situations where another device (e.g., the merchant device) is to determine whether the client device is located within a relatively small geographic area (e.g., in a drive-through, in a retail store, between refueling pumps or charging stations, and/or the like) and/or is to distinguish between the client device and other client devices in a relatively small geographic area.

Figure 1B:
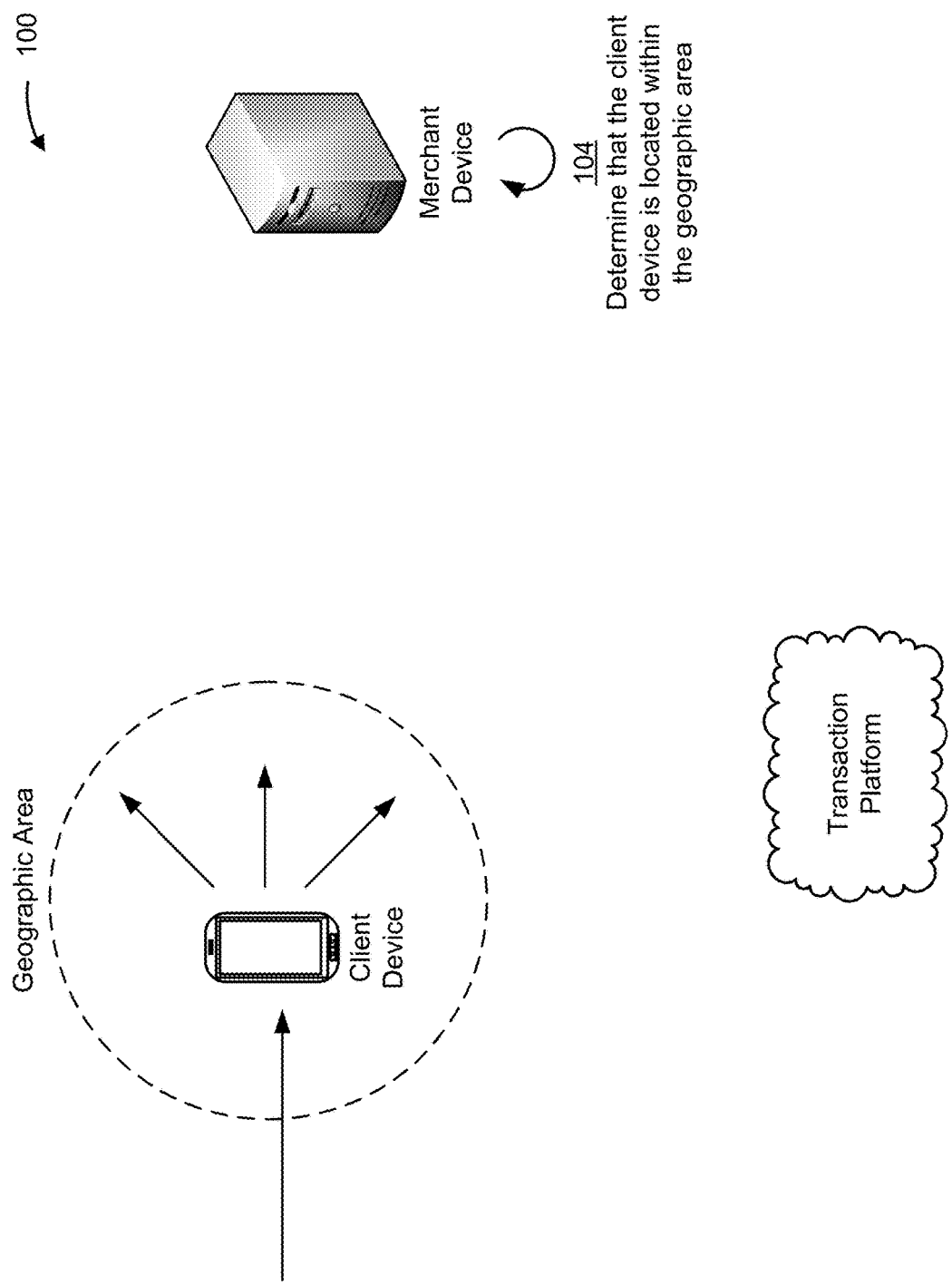

As shown in FIG. 1B, and by reference number 104, the merchant device can receive the broadcasted location information associated with the client device and can determine that the client device is located within the geographic area based on the location information. The merchant device can monitor one or more BLE advertisement channels for the location information, can monitor a Wi-Fi network associated with the merchant for the location information, and/or the like, in order to receive the location information. The merchant device can determine that the client device is located within the geographic area based on the RTK-assisted GNSS location, of the client device, indicated in the location information.

As shown in FIG. 1C, and by reference number 106, the merchant device can establish a peer-to-peer connection with the client device. In some implementations, the merchant device can establish the peer-to-peer connection with the client device based on determining that the client device is located within the geographic area. In some implementations, the merchant device can establish the peer-to-peer connection with the client device based on determining that the client device has been located within the geographic area for a threshold amount of time (e.g., 10 seconds, 30 seconds, and/or the like). In some implementations, the peer-to-peer connection can include a Bluetooth connection via a non-BLE-advertisement channel (e.g., a BLE peer-to-peer channel), a Wi-Fi direct connection, a cellular connection, a sidelink connection, and/or the like.

In some implementations, the merchant device can initiate the peer-to-peer connection by transmitting, to the client device, a peer-to-peer connection request. The peer-to-peer connection request can include various types of connection request messages, such as a handshake request message and/or the like. The merchant device can use message encryption to ensure the authenticity of the merchant device and/or the merchant. In some implementations, the client device can determine that the peer-to-peer connection request, transmitted by the merchant device, is legitimate via decryption of the data in the peer-to-peer connection request using a secret key known by both devices (e.g., a secret key that the merchant device uses to encrypt the data included in the connection request). In this case, the client device can decrypt a peer-to-peer connection request, using the secret key, into an expected message format in order to determine that the peer-to-peer connection request is legitimate. If the client device determines that the peer-to-peer connection request is legitimate, the client device can accept the peer-to-peer connection request and continue to establish the peer-to-peer connection with the merchant device. If the client device determines that the peer-to-peer connection request decrypts into an invalid message format using the secret key, the client device can ignore the peer-to-peer connection request and/or deny the peer-to-peer connection request.

Figure 1D:
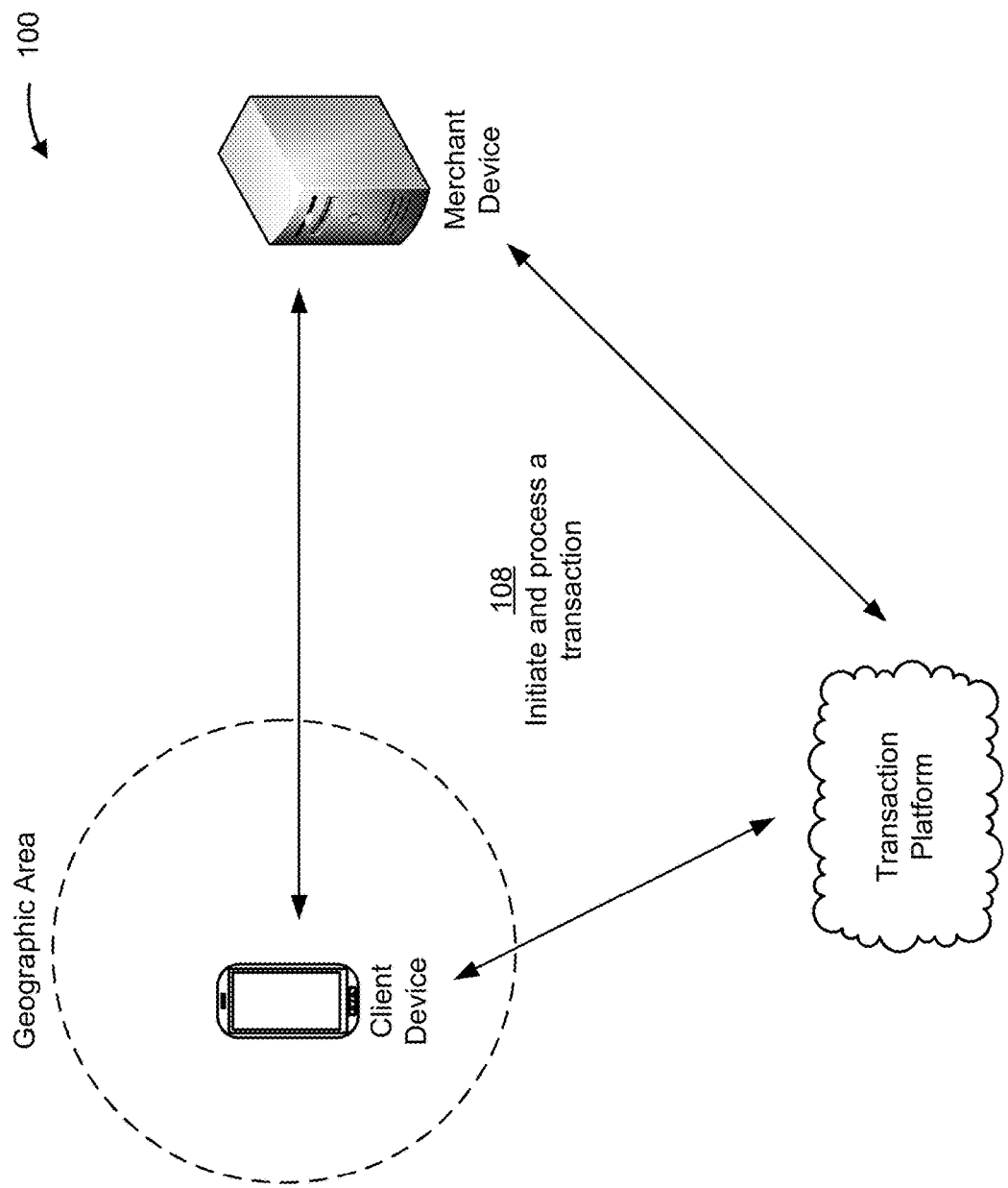

As shown in FIG. 1D, and by reference number 108, the client device, the merchant device, and/or the transaction platform can initiate and process the transaction. In some implementations, the client device, the merchant device, and/or the transaction platform can initiate and process the transaction based on the peer-to-peer connection between the client device and the merchant device being established, prior to establishing the peer-to-peer connection, during establishment of the peer-to-peer connection, and/or the like.

In some implementations, the user can place an order, associated with the transaction, with the merchant outside of the peer-to-peer connection. In this case, the client device can then initiate the transaction by broadcasting the location information such that the client device and the merchant device can establish the peer-to-peer connection based on the order being placed. The client device can provide information associated with the order (e.g., an order number, one or more items and/or services associated with the order, and/or the like) once the peer-to-peer connection is established. As an example, a user can drive a vehicle through a restaurant drive-through and can place an order with a restaurant employee. The restaurant employee can provide the user with an order number, which the user can provide as input to the client device. The client device can provide the order number to the merchant device via the peer-to-peer connection.

As another example, the client device can initiate the transaction by displaying a user interface based on the peer-to-peer connection being established. In this case, the user can use the user interface to place the order with the merchant, and the information associated with the order can be transmitted to the merchant device via the user interface and peer-to-peer connection. As an example, the client device and the merchant device can establish the peer-to-peer connection to initiate an order at a retail store, and the client device can transmit the information associated with the order to the merchant device based on the user providing input via the user interface.

In some implementations, the merchant device can initiate the transaction, based on the establishment of the peer-to-peer connection, by transmitting a transaction authorization request to the client device. The client device can transmit the transaction authorization (e.g., automatically, based on input received from the user, and/or the like) to the transaction platform, and the transaction platform can provide a transaction authorization confirmation to the merchant device based on receiving the transaction authorization from the client device. As an example, the transaction can include refueling a vehicle at a refueling station, and the transaction authorization can include a payment pre-authorization. In this case, the merchant can permit the user to refuel the vehicle based on receiving the payment pre-authorization confirmation.

In some implementations, the client device can transmit the transaction authorization to the transaction platform via a connection other than the peer-to-peer connection. For example, the client device can transmit the transaction authorization to the transaction platform via an application associated with the transaction platform, via a web portal associated with the transaction platform, via a public or private network, and/or the like.

Figure 1E:
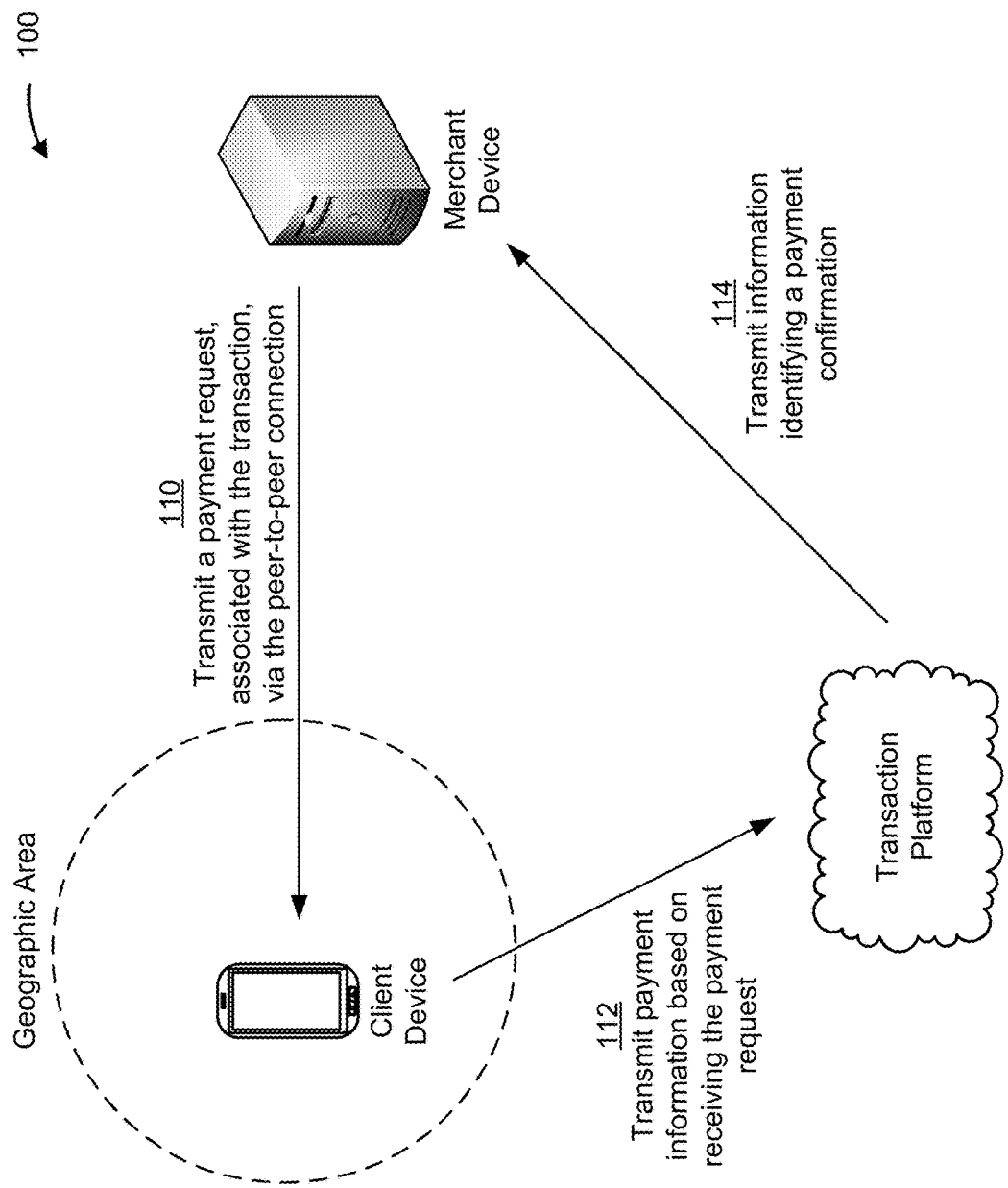

As shown in FIG. 1E, and by reference number 110, the merchant device can process the transaction by transmitting a payment request to the client device via the peer-to-peer connection. The payment request, associated with the transaction, can include information identifying the transaction (e.g., an order number, a name of the user, and/or the like), can include information identifying one or more goods and/or services provided as part of the transaction, can include information identifying a payment amount, and/or the like.

In some implementations, the merchant device can transmit the payment request to the client device based on an event. For example, the merchant device can transmit the payment request to the client device based on determining that the user has completed refueling a vehicle. As another example, the merchant device can transmit the payment request to the client device based on receiving, from the client device, information associated with an order. As another example, the merchant device can transmit the payment request to the client device based on receiving, from the client device, a request for the payment request.

As further shown in FIG. 1E, and by reference number 112, the client device can transmit, to the transaction platform, payment information associated with the transaction. The client device can transmit the payment information based on receiving the payment request from the merchant device. In some implementations, the client device can transmit the payment information via a connection other than the peer-to-peer connection. For example, the client device can transmit the payment information via an application associated with the transaction platform, via a web portal associated with the transaction platform, via a public or private network, and/or the like.

The payment information can include information identifying the transaction (e.g., an order number, a name of the user, and/or the like), can include information identifying one or more goods and/or services provided as part of the transaction, can include information identifying a payment amount, can include information identifying a payment type (e.g., credit card, electronic payment, and/or the like), and/or the like.

The transaction platform can receive the payment information and can process the payment for the transaction based on the payment information. In some implementations, the transaction platform can process the payment via a distributed ledger, such as a blockchain and/or another type of private distributed ledger.

As further shown in FIG. 1E, and by reference number 114, the transaction platform can transmit information identifying a payment confirmation based on successfully processing the payment for the transaction. In some implementations, the transaction platform can transmit the payment confirmation to the merchant platform. In some implementations, the transaction platform can transmit the information identifying the payment confirmation to the merchant platform and the client device. In some implementations, the information identifying the payment confirmation can include an indication that the payment for the transaction was successfully completed, can include information identifying a time and/or date of the payment, and/or the like.

Figure 1F:
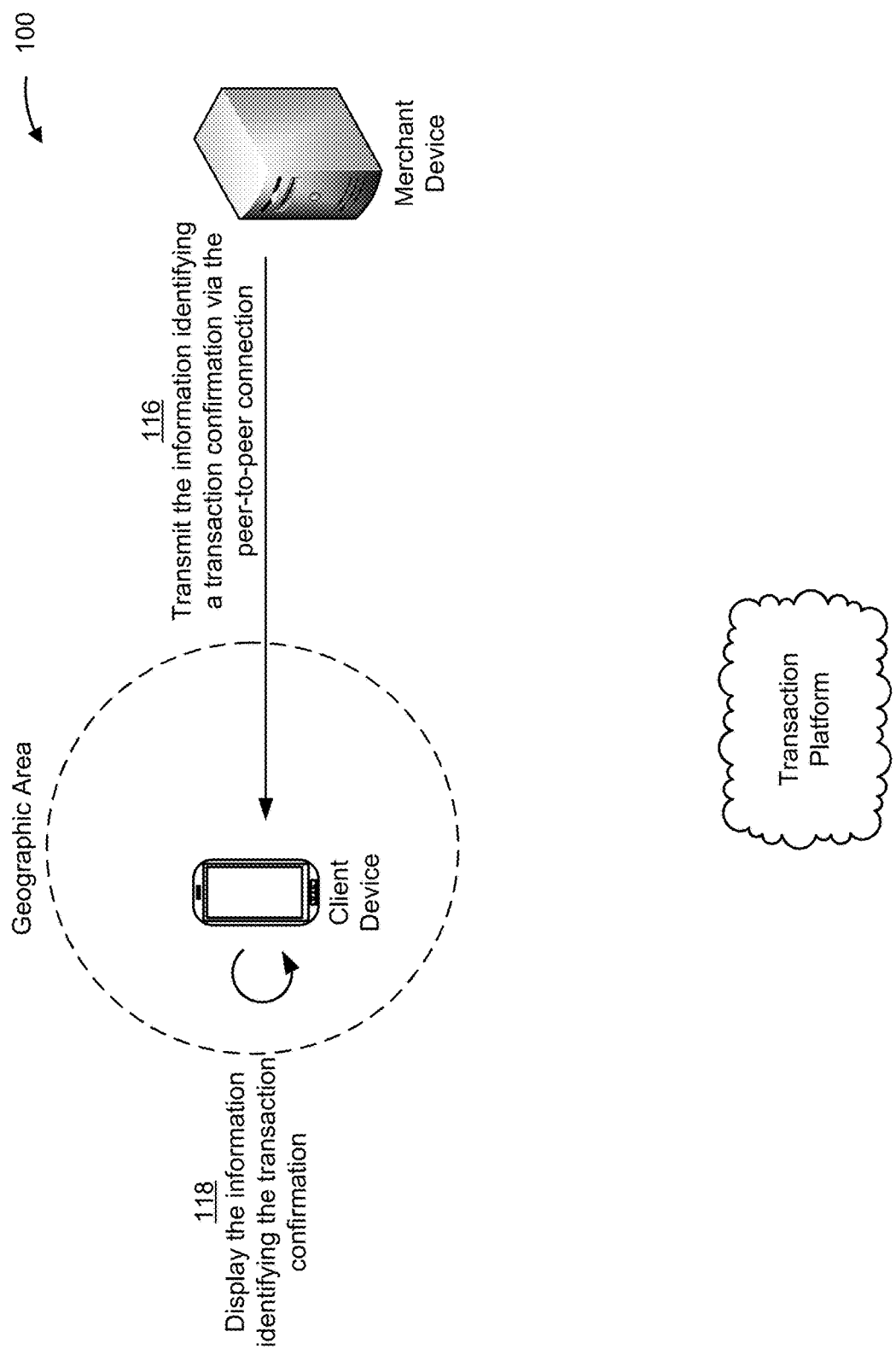

As shown in FIG. 1F, and by reference number 116, the merchant device can transmit information identifying a transaction confirmation to the client device. In some implementations, the merchant device can transmit the information identifying the transaction confirmation to the client device via the peer-to-peer connection. In some implementations, the merchant device can transmit the information identifying the transaction confirmation based on receiving the information identifying the payment confirmation from the transaction platform.

The information identifying the transaction confirmation can include information indicating that the payment and/or the transaction were successfully completed, information identifying the goods and/or services associated with the transaction, information identifying an amount paid for the transaction, information identifying a time and/or date associated with the transaction, information identifying the user and/or the merchant, and/or the like.

As further shown in FIG. 1F, and by reference number 118, the client device can display the information identifying the transaction confirmation so that the user can view the information identifying the transaction confirmation. In some implementations, the client device can display the information identifying the transaction confirmation on a display of the client device. Additionally and/or alternatively, the client device can play an audio playback of the information identifying the transaction confirmation via a speaker associated with the client device and/or of a vehicle associated with the user.

In this way, the client device can broadcast location information associated with the client device such that the merchant device can determine, based on the location information, that the client device is located within a particular geographic area. This permits the merchant device to establish a peer-to-peer connection with the client device based on determining that the client device is located within the geographic area. The client device and the merchant device can then process a transaction via the peer-to-peer connection. This permits the merchant device to quickly and accurately identify the client device, and to initiate and process the transaction based on a hyper-accurate RTK-assisted GNSS location. This reduces the overall time duration of the transaction, and decreases the consumption of processing, memory, and networking resources, compared to attempting to locate the client device and initiate and process the transaction via an application or web portal associated with the merchant device.

As indicated above, FIGS. 1A-1F are provided as examples. Other examples can differ from what is described with regard to FIGS. 1A-1F. For example, while the techniques and actions, described above in connection with FIGS. 1A-1F, are described in connection with a transaction between a client device and a merchant device, the techniques and actions can be implemented in many different types of transactions between client devices, between merchant devices, and/or between other devices.

Moreover, the techniques and actions, described above in connection with FIGS. 1A-1F, can be used in other scenarios, such as between vehicles for collision detection and avoidance. For example, a first vehicle (or device associated with the first vehicle) can broadcast location information identifying an RTK-assisted GNSS location of the first vehicle, a second vehicle (or device associated with second vehicle) can receive the location information and determine that the first vehicle is within a threshold distance of the second vehicle (e.g., a threshold distance that can indicate a potential collision), and accordingly can establish a peer-to-peer connection with the first vehicle to transmit a communication to the first vehicle (e.g., a collision warning, a request to adjust a direction and/or speed of travel, and/or the like).

Figure 2:
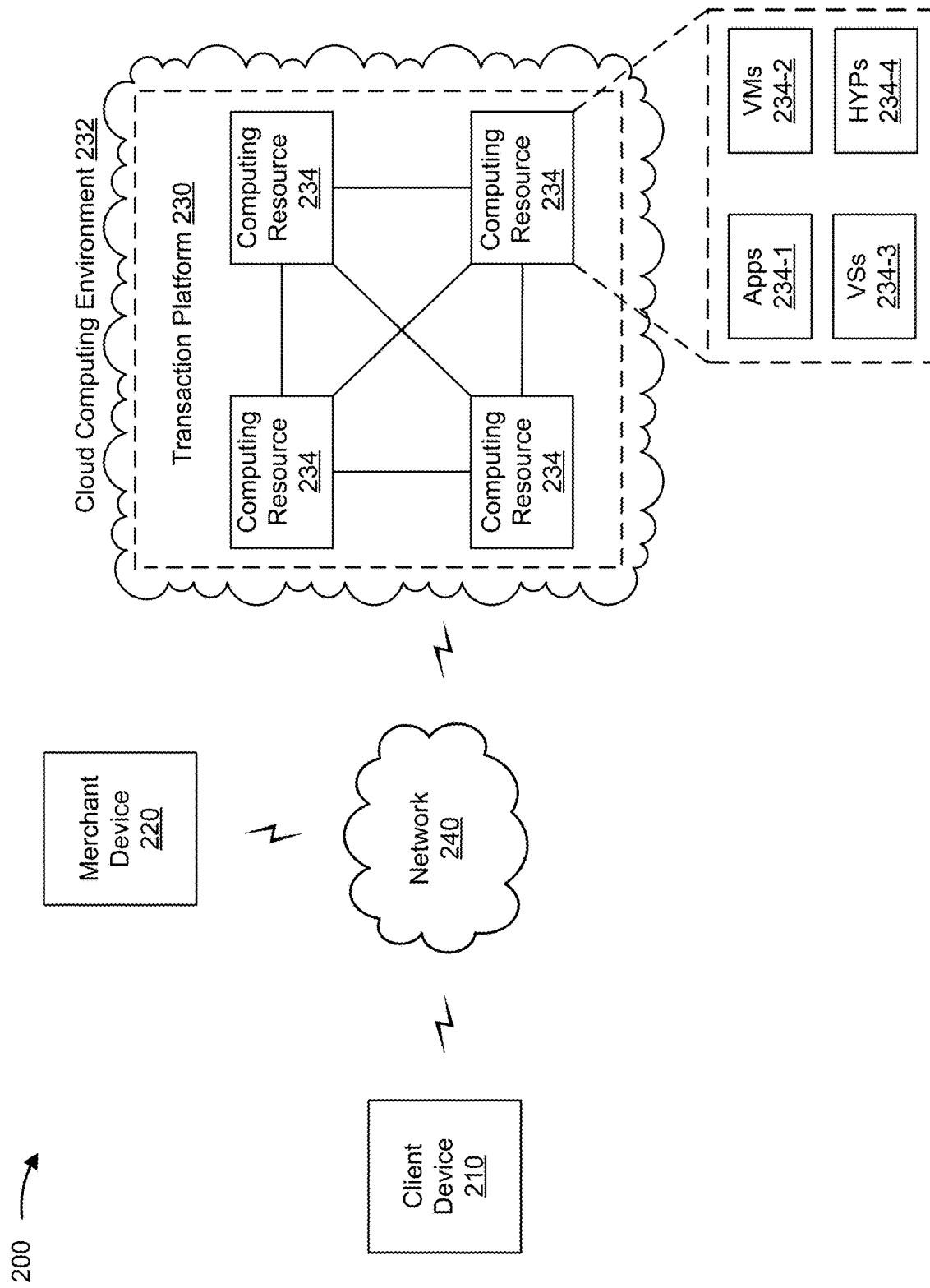
FIG. 2 is a diagram of an example environment in which systems and/or methods described herein can be implemented.

FIG. 2 is a diagram of an example environment 200 in which systems and/or methods described herein can be implemented. As shown in FIG. 2, environment 200 can include a client device 210, a merchant device 220, a transaction platform 230 in a cloud computing environment 232 that includes a set of computing resources 234, and/or a network 240. Devices of environment 200 can interconnect via wired connections, wireless connections, or a combination of wired and wireless connections.

Client device 210 includes one or more devices capable of receiving, generating, storing, processing, and/or providing information associated with initiating a transaction based on an RTK-assisted GNSS location of a device. For example, client device 210 can include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a GNSS-based navigation device, a vehicle device (e.g., an in-dash infotainment device, head device, and/or the like), and/or a similar type of device. In some implementations, client device 210 can be capable of determining a non-RTK-assisted GNSS location associated with client device 210, can be capable of determining an RTK-assisted GNSS location associated with client device 210, can be capable of initiating and/or processing a transaction between client device 210 and merchant device 220, can be capable of transmitting information to merchant device 220 and/or transaction platform 230 (e.g., location information, information associated with a transaction, payment information, and/or the like), capable of receiving information from merchant device 220 and/or transaction platform 230 (e.g., information associated with a transaction, a payment request associated with a transaction, information identifying a payment confirmation, information identifying a transaction confirmation, and/or the like), and/or the like.

Merchant device 220 includes one or more devices capable of receiving, generating, storing, processing, and/or providing information associated with initiating a transaction based on location of a device. In some implementations, merchant device 220 can include a server (e.g., in a data center or a cloud computing environment), a data center (e.g., a multi-server micro datacenter), a workstation computer, a virtual machine (VM) provided in a cloud computing environment, or a similar type of device. In some implementations, merchant device 220 can include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device. In some implementations, merchant device 220 can be capable of determining that client device 210 is located within a particular geographic area, can be capable of initiating and/or processing a transaction between client device 210 and merchant device 220, can be capable of transmitting information to client device 210 and/or transaction platform 230 (e.g., information associated with a transaction, a payment request, information identifying a transaction confirmation and/or the like), can be capable of receiving information from client device 210 and/or transaction platform 230 (e.g., information associated with a transaction, information identifying a payment confirmation, and/or the like), and/or the like.

Transaction platform 230 includes one or more devices capable of receiving, generating, storing, processing, and/or providing information associated with initiating a transaction based on location of a device. For example, transaction platform 230 can be capable of transmitting information to client device 210 and/or merchant device 220 (e.g., information associated with a transaction, information identifying a payment confirmation, and/or the like), capable of receiving information from client device 210 and/or merchant device 220 (e.g., information associated with a transaction, payment information, and/or the like), and/or the like.

In some implementations, as shown, transaction platform 230 can be hosted in cloud computing environment 232. Notably, while implementations described herein describe transaction platform 230 as being hosted in cloud computing environment 232, in some implementations, transaction platform 230 might not be cloud-based (i.e., can be implemented outside of a cloud computing environment) or can be partially cloud-based.

Cloud computing environment 232 includes an environment that hosts transaction platform 230. Cloud computing environment 232 can provide computation, software, data access, storage, and/or other services. As shown, cloud computing environment 232 can include a group of computing resources 234 (referred to collectively as "computing resources 234" and individually as "computing resource 234"), which can also be referred to as processing nodes.

Computing resource 234 includes one or more personal computers, workstation computers, server devices, or another type of computation and/or communication device. In some implementations, computing resource 234 can host transaction platform 230. The cloud resources can include compute instances executing in computing resource 234, storage devices provided in computing resource 234, data transfer devices provided by computing resource 234, etc. In some implementations, computing resource 234 can communicate with other computing resources 234 via wired connections, wireless connections, or a combination of wired and wireless connections.

As further shown in FIG. 2, computing resource 234 can include a group of cloud resources, such as one or more applications ("APPs") 234-1, one or more virtual machines ("VMs") 234-2, one or more virtualized storages ("VSs") 234-3, or one or more hypervisors ("HYPs") 234-4.

Application 234-1 includes one or more software applications that can be provided to or accessed by one or more devices of environment 200. Application 234-1 can eliminate a need to install and execute the software applications on devices of environment 200. For example, application 234-1 can include software associated with transaction platform 230 and/or any other software capable of being provided via cloud computing environment 232. In some implementations, one application 234-1 can send/receive information to/from one or more other applications 234-1, via virtual machine 234-2. In some implementations, application 234-1 can include a software application associated with one or more databases and/or operating systems. For example, application 234-1 can include an enterprise application, a functional application, an analytics application, and/or the like.

Virtual machine 234-2 includes a software implementation of a machine (e.g., a computer) that executes programs like a physical machine. Virtual machine 234-2 can be either a system virtual machine or a process virtual machine, depending upon use and degree of correspondence to any real machine by virtual machine 234-2. A system virtual machine can provide a complete system platform that supports execution of a complete operating system ("OS"). A process virtual machine can execute a single program, and can support a single process. In some implementations, virtual machine 234-2 can execute on behalf of a user (e.g., a user of client device 210, a user of merchant device 220, and/or the like), and can manage infrastructure of cloud computing environment 232, such as data management, synchronization, or long-duration data transfers.

Virtualized storage 234-3 includes one or more storage systems and/or one or more devices that use virtualization techniques within the storage systems or devices of computing resource 234. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can permit administrators of the storage system flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 234-4 provides hardware virtualization techniques that allow multiple operating systems (e.g., "guest operating systems") to execute concurrently on a host computer, such as computing resource 234. Hypervisor 234-4 can present a virtual operating platform to the guest operating systems, and can manage the execution of the guest operating systems. Multiple instances of a variety of operating systems can share virtualized hardware resources.

Network 240 includes one or more wired and/or wireless networks. For example, network 240 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there can be additional devices and/or networks, fewer devices and/or networks, different devices and/or networks, or differently arranged devices and/or networks than those shown in FIG. 2. Furthermore, two or more devices shown in FIG. 2 can be implemented within a single device, or a single device shown in FIG. 2 can be implemented as multiple, distributed devices. Additionally, or alternatively, a set of devices (e.g., one or more devices) of environment 200 can perform one or more functions described as being performed by another set of devices of environment 200.

Figure 3:
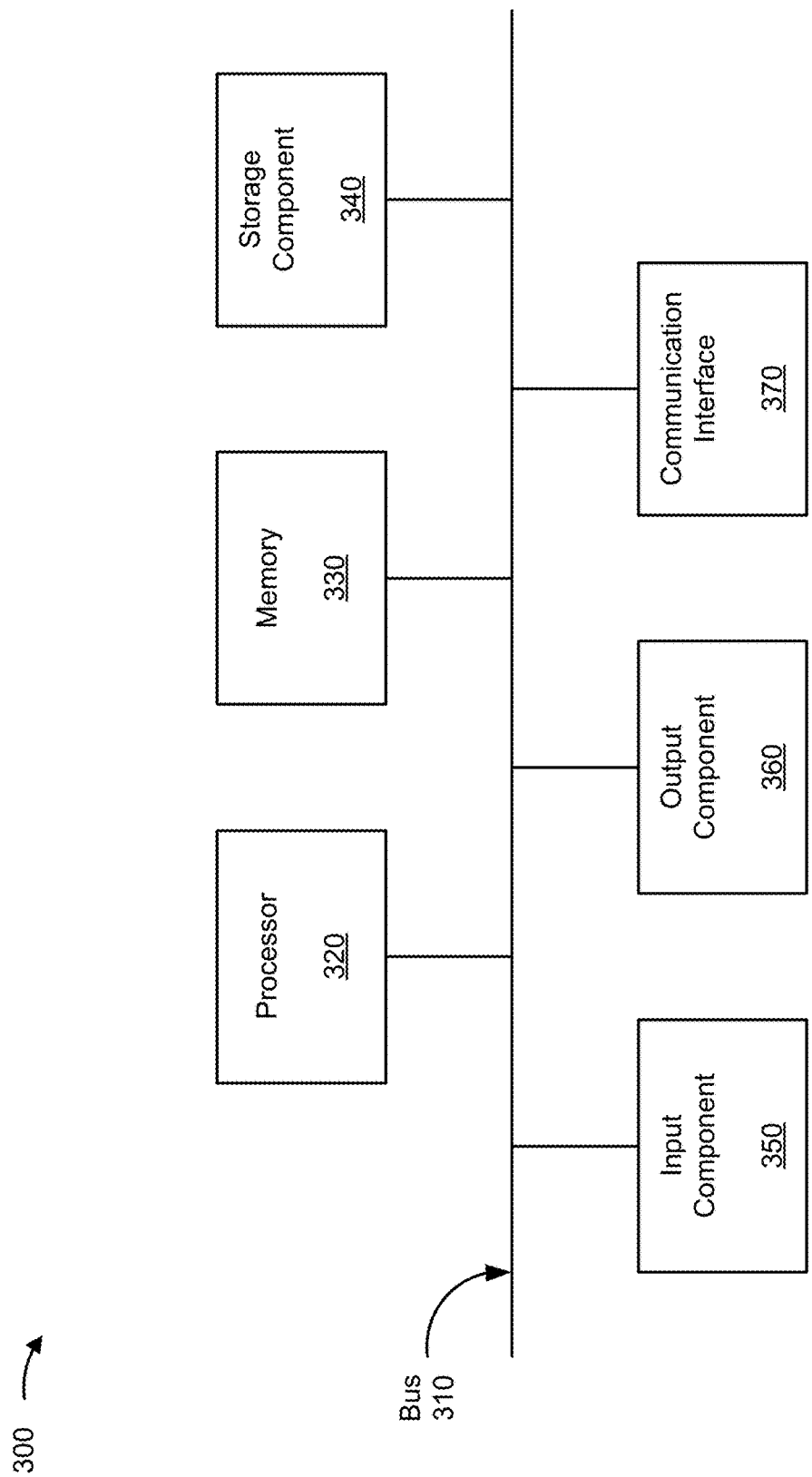
FIG. 3 is a diagram of example components of one or more devices of FIG. 2.

FIG. 3 is a diagram of example components of a device 300. Device 300 can correspond to client device 210, merchant device 220, transaction platform 230, and/or computing resource 234. In some implementations, client device 210, merchant device 220, transaction platform 230, and/or computing resource 234 can include one or more devices 300 and/or one or more components of device 300. As shown in FIG. 3, device 300 can include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 can include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 can include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 can permit device 300 to receive information from another device and/or provide information to another device. For example, communication interface 370 can include an Ethernet interface, an optical interface, a coaxial interface, an infrared interface, a radio frequency (RF) interface, a universal serial bus (USB) interface, a Wi-Fi interface, a cellular network interface, or the like.

Device 300 can perform one or more processes described herein. Device 300 can perform these processes based on to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions can be read into memory 330 and/or storage component 340 from another computer-readable medium or from another device via communication interface 370. When executed, software instructions stored in memory 330 and/or storage component 340 can cause processor 320 to perform one or more processes described herein. Additionally, or alternatively, hardwired circuitry can be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 can include additional components, fewer components, different components, or differently arranged components than those shown in FIG. 3. Additionally, or alternatively, a set of components (e.g., one or more components) of device 300 can perform one or more functions described as being performed by another set of components of device 300.

Figure 4:
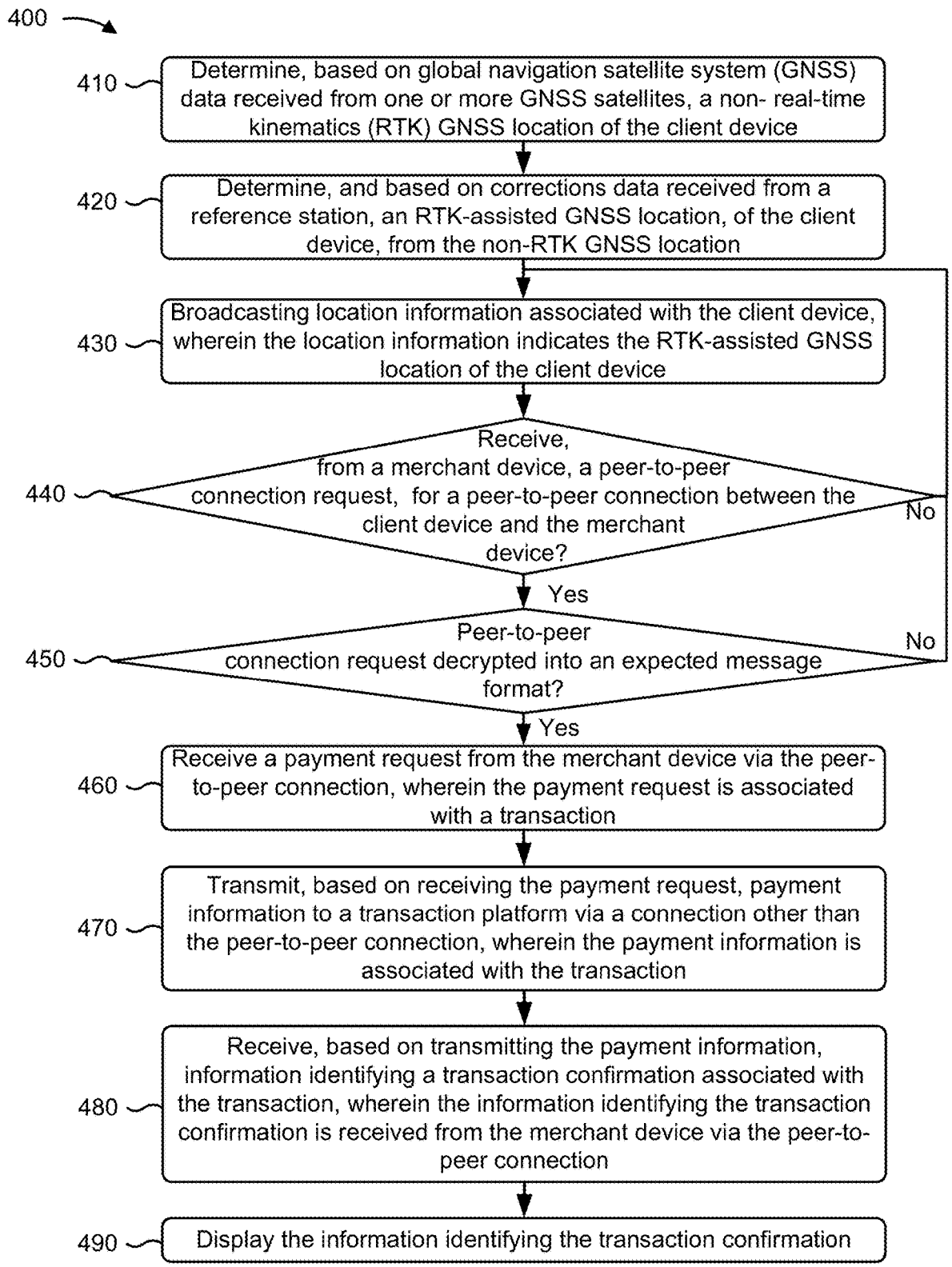
FIG. 4 is a flow chart of an example process for initiating a transaction based on a real-time kinematics (RTK) assisted location of a device.

FIG. 4 is a flow chart of an example process 400 for initiating a transaction based on an RTK-assisted GNSS location of a device. In some implementations, one or more process blocks of FIG. 4 can be performed by client device (e.g., client device 210). In some implementations, one or more process blocks of FIG. 4 can be performed by another device or a group of devices separate from or including the client device, such as a merchant device (e.g., merchant device 220), a transaction platform (e.g., transaction platform 230), and/or the like.

As shown in FIG. 4, process 400 can include determining, based on GNSS data received from one or more GNSS satellites, a non-RTK GNSS location of the client device (block 410). For example, the client device (e.g., using processor 320, memory 330, storage component 340, input component 350, output component 360, communication interface 370 and/or the like) can determine, based on GNSS data received from one or more GNSS satellites, a non-RTK GNSS location of the client device, as described above.

As shown in FIG. 4, process 400 can include determining, based on corrections data received from a reference station, an RTK-assisted GNSS location, of the client device, from the non-RTK GNSS location (block 420). For example, the client device (e.g., using processor 320, memory 330, storage component 340, input component 350, output component 360, communication interface 370 and/or the like) can determining, based on corrections data received from a reference station, an RTK-assisted GNSS location, of the client device, from the non-RTK GNSS location, as described above.

As shown in FIG. 4, process 400 can include broadcasting location information associated with the client device wherein the location information indicates the RTK-assisted GNSS location of the client device (block 430). For example, the client device (e.g., using processor 320, memory 330, storage component 340, input component 350, output component 360, communication interface 370 and/or the like) can broadcast location information associated with the client device, as described above. In some implementations, the location information indicates the RTK-assisted GNSS location of the client device.

As further shown in FIG. 4, process 400 can include receiving, from a merchant device, a peer-to-peer connection request, for a peer-to-peer connection between the client device and the merchant device, based on transmitting the location information and based on the RTK-assisted GNSS location of the client device being located within a particular geographic area (block 440). For example, the client device (e.g., using processor 320, memory 330, storage component 340, input component 350, output component 360, communication interface 370 and/or the like) can receive, from a merchant device, a peer-to-peer connection request, for a peer-to-peer connection between the client device and the merchant device, based on transmitting the location information and based on the RTK-assisted GNSS location of the client device being located within a particular geographic area, as described above. In some implementations, if the client device does not receive a peer-to-peer connection request from the merchant device (block 440-No), the client device can return to block 430 and continue to broadcast the location information.

As further shown in FIG. 4, if the client device receives a peer-to-peer connection request from the merchant device (block 440-Yes), process 400 can include determining whether the peer-to-peer connection request decrypted into an expected message format (block 450). For example, the client device (e.g., using processor 320, memory 330, storage component 340, input component 350, output component 360, communication interface 370 and/or the like) can determine whether the peer-to-peer connection request decrypted into an expected message format, as described above. In some implementations, if the client device determines that the peer-to-peer connection request does not decrypt into the expected message format (block 450-No), the client device can ignore and/or reject the peer-to-peer connection request and can return to block 430 and continue to broadcast the location information.

As further shown in FIG. 4, f the client device determines that the peer-to-peer connection request decrypts into the expected message format (block 450-Yes), process 400 can include receiving a payment request from the merchant device via the peer-to-peer connection wherein the payment request is associated with a transaction (block 460). For example, the client device (e.g., using processor 320, memory 330, storage component 340, input component 350, output component 360, communication interface 370 and/or the like) can receive a payment request from the merchant device via the peer-to-peer connection, as described above. In some implementations, the payment request is associated with a transaction.

As further shown in FIG. 4, process 400 can include transmitting, based on receiving the payment request, payment information to a transaction platform via a connection other than the peer-to-peer connection wherein the payment information is associated with the transaction (block 470). For example, the client device (e.g., using processor 320, memory 330, storage component 340, input component 350, output component 360, communication interface 370 and/or the like) can transmit, based on receiving the payment request, payment information to a transaction platform via a connection other than the peer-to-peer connection, as described above. In some implementations, the payment information is associated with the transaction.

As further shown in FIG. 4, process 400 can include receiving, based on transmitting the payment information, information identifying a transaction confirmation associated with the transaction wherein the information identifying the transaction confirmation is received from the merchant device via the peer-to-peer connection (block 480). For example, the client device (e.g., using processor 320, memory 330, storage component 340, input component 350, output component 360, communication interface 370 and/or the like) can receive, based on transmitting the payment information, information identifying a transaction confirmation associated with the transaction, as described above. In some implementations, the information identifying the transaction confirmation is received from the merchant device via the peer-to-peer connection.

As further shown in FIG. 4, process 400 can include displaying the information identifying the transaction confirmation (block 490). For example, the client device (e.g., using processor 320, memory 330, storage component 340, input component 350, output component 360, communication interface 370 and/or the like) can display the information identifying the transaction confirmation, as described above.

Process 400 can include additional implementations, such as any single implementation or any combination of implementations described below and/or in connection with one or more other processes described elsewhere herein.

In some implementations, process 400 can include establishing the peer-to-peer connection based on receiving the peer-to-peer connection request. In some implementations, establishing the peer-to-peer connection can include decrypting the peer-to-peer connection request using a secret key associated with the client device and the merchant device, determining whether data, included in the peer-to-peer connection request, decrypted into an expected format, and establishing the peer-to-peer connection based on determining that the data, included in the peer-to-peer connection request, decrypted into the expected format.

In some implementations, broadcasting the location information comprises broadcasting the location information via at least one of a BLE advertisement channel, a Wi-Fi channel, or a cellular network. In some implementations, the peer-to-peer connection is via at least one of a BLE non-advertisement channel, a Wi-Fi direct channel, or a cellular sidelink channel. In some implementations, process 400 further comprises transmitting, to the merchant device and via the peer-to-peer connection, information associated with the transaction and receiving, based on transmitting the information associated with the transaction, the payment request from the merchant device via the peer-to-peer connection.

In some implementations, process 400 further comprises receiving a transaction authorization request, for the transaction, from the merchant device via the peer-to-peer connection; transmitting, to the transaction platform and based on receiving the transaction authorization request, information identifying a transaction authorization for the transaction; and receiving, based on transmitting the information identifying the transaction authorization, the payment request from the merchant device via the peer-to-peer connection.

Although FIG. 4 shows example blocks of process 400, in some implementations, process 400 can include additional blocks, fewer blocks, different blocks, or differently arranged blocks than those depicted in FIG. 4. Additionally, or alternatively, two or more of the blocks of process 400 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

As used herein, satisfying a threshold can, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

Certain user interfaces have been described herein and/or shown in the figures. A user interface can include a graphical user interface, a non-graphical user interface, a text-based user interface, and/or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   determining, by a client device and based on global navigation satellite system (GNSS) data received from one or more GNSS satellites, a non-real-time kinematics (RTK) GNSS location of the client device;
   determining, by the client device and based on corrections data received from a reference station, an RTK-assisted GNSS location, of the client device, from the non-RTK GNSS location of the client device;
   broadcasting, by the client device and via an advertisement channel, location information associated with the client device,
      wherein the location information indicates the RTK-assisted GNSS location of the client device, and
      wherein the advertisement channel includes a wireless advertisement channel that is reserved for the client device to broadcast the location information without having to establish a connection with another device;
   receiving, by the client device and from a merchant device, a peer-to-peer connection request, for a peer-to-peer connection between the client device and the merchant device, based on:
      transmitting the location information,
      using the RTK-assisted GNSS location of the client device to determine that the client device is located in a particular geographic area that the merchant device is monitoring via the advertisement channel for a threshold amount of time, and
      wherein the peer-to-peer connection is a separate communication channel from the advertisement channel;
   initiating, by the client device and based on the peer-to-peer connection being established, a transaction;
   receiving, by the client device, a payment request from the merchant device via the peer-to-peer connection, wherein the payment request is associated with the transaction;
   transmitting, by the client device and based on receiving the payment request, payment information to a transaction platform via a connection other than the peer-to-peer connection,
      wherein the payment information is associated with the transaction;
   receiving, by the client device and based on transmitting the payment information, information identifying a transaction confirmation associated with the transaction,
      wherein the information identifying the transaction confirmation is received from the merchant device via the peer-to-peer connection; and
   displaying, by the client device, the information identifying the transaction confirmation.

2. The method of claim 1, further comprising:
   establishing the peer-to-peer connection based on receiving the peer-to-peer connection request.

3. The method of claim 2, wherein establishing the peer-to-peer connection comprises:
   decrypting the peer-to-peer connection request using a secret key associated with the client device and the merchant device;
   determining whether data, included in the peer-to-peer connection request, decrypted into an expected format; and
   establishing the peer-to-peer connection based on determining that the data, included in the peer-to-peer connection request, decrypted into the expected format.

4. The method of claim 1, wherein broadcasting the location information comprises:
   broadcasting the location information via at least one of:
      a Bluetooth low energy (BLE) advertisement channel,
      a Wi-Fi channel, or
      a cellular network.

5. The method of claim 1, wherein the peer-to-peer connection is via at least one of:
   a Bluetooth low energy (BLE) non-advertisement channel,
   a Wi-Fi direct channel, or
   a cellular sidelink channel.

6. The method of claim 1, further comprising:
   transmitting, to the merchant device and via the peer-to-peer connection, information associated with the transaction; and
   receiving, based on transmitting the information associated with the transaction, the payment request from the merchant device via the peer-to-peer connection.

7. The method of claim 1, further comprising:
   receiving a transaction authorization request, for the transaction and before receiving the payment request, from the merchant device via the peer-to-peer connection; and
   transmitting, to the transaction platform and based on receiving the transaction authorization request, information identifying a transaction authorization for the transaction; and
   wherein receiving the payment request from the merchant device via the peer-to-peer connection includes:
      receiving, based on transmitting the information identifying the transaction authorization, the payment request from the merchant device via the peer-to-peer connection.

8. A client device, comprising:
   one or more memories; and
   one or more processors communicatively coupled to the one or more memories, to:

determine, based on global navigation satellite system (GNSS) data received from one or more GNSS satellites, a non-real-time kinematics (RTK) GNSS location of the client device;

determine, based on corrections data received from a reference station, an RTK-assisted GNSS location, of the client device, from the non-RTK GNSS location of the client device;

broadcast, via an advertisement channel, location information associated with the client device,
 wherein the location information indicates the RTK-assisted GNSS location of the client device, and
 wherein the advertisement channel includes a wireless advertisement channel that is reserved for the client device to broadcast the location information without having to establish a connection with another device;

receive, from a merchant device, a peer-to-peer connection request, for a peer-to-peer connection between the client device and the merchant device, based on:
 transmission of the location information,
 use of the RTK-assisted GNSS location of the client device to determine that the client device is located in a particular geographic area that the merchant device is monitoring via the advertisement channel for a threshold amount of time, and
 wherein the peer-to-peer connection is a separate communication channel from the advertisement channel;

initiate, based on the peer-to-peer connection being established, a transaction;

receive a payment request from the merchant device via the peer-to-peer connection,
 wherein the payment request is associated with the transaction;

transmit, based on receiving the payment request, payment information to a transaction platform via the connection other than the peer-to-peer connection,
 wherein the payment information is associated with the transaction;

receive, based on transmitting the payment information, information identifying a transaction confirmation associated with the transaction,
 wherein the information identifying the transaction confirmation is received from the merchant device via the peer-to-peer connection; and display the information identifying the transaction confirmation.

9. The client device of claim 8, wherein the one or more processors are further to:
 establish the peer-to-peer connection based on receiving the peer-to-peer connection request.

10. The client device of claim 9, wherein the one or more processors, when establishing the peer-to-peer connection, are to:
 decrypt the peer-to-peer connection request using a secret key associated with the client device and the merchant device;
 determine whether data, included in the peer-to-peer connection request, decrypted into an expected format; and
 establish the peer-to-peer connection based on determining that the data, included in the peer-to-peer connection request, decrypted into the expected format.

11. The client device of claim 8, wherein the one or more processors, when broadcasting the location information, are to:
 broadcast the location information via at least one of:
  a Bluetooth low energy (BLE) advertisement channel,
  a Wi-Fi channel, or
  a cellular network.

12. The client device of claim 8, wherein the peer-to-peer connection is via at least one of:
 a Bluetooth low energy (BLE) non-advertisement channel,
 a Wi-Fi direct channel, or
 a cellular sidelink channel.

13. The client device of claim 8, wherein the one or more processors are further configured to:
 transmit, to the merchant device and via the peer-to-peer connection, information associated with the transaction; and
 receive, based on transmitting the information associated with the transaction, the payment request from the merchant device via the peer-to-peer connection.

14. The client device of claim 8, wherein the one or more processors are further configured to:
 receive a transaction authorization request, for the transaction and before receiving the payment request, from the merchant device via the peer-to-peer connection; and
 transmit, to the transaction platform and based on receiving the transaction authorization request, information identifying a transaction authorization for the transaction; and
 wherein the one or more processors, when receiving the payment request from the merchant device via the peer-to-peer connection, are to:
  receive, based on transmitting the information identifying the transaction authorization, the payment request from the merchant device via the peer-to-peer connection.

15. A non-transitory computer-readable medium storing instructions, the instructions comprising:
 one or more instructions that, when executed by one or more processors of a client device, cause the one or more processors to:
  determine, based on global navigation satellite system (GNSS) data received from one or more GNSS satellites, a non-real-time kinematics (RTK) GNSS location of the client device;
  determine, based on corrections data received from a reference station, an RTK-assisted GNSS location, of the client device, from the non-RTK GNSS location;
  broadcast, via an advertisement channel, location information associated with the client device,
   wherein the location information indicates the RTK-assisted GNSS location of the client device, and
   wherein the advertisement channel includes a wireless advertisement channel that is reserved for the client device to broadcast without having to establish a connection with another device;
  receive, from a merchant device, a peer-to-peer connection request, for a peer-to-peer connection between the client device and the merchant device, based on:
   transmission of the location information,
   use of the RTK-assisted GNSS location of the client device to determine that the client device is located in a particular geographic area that the merchant device is monitoring via the advertisement channel for a threshold amount of time,
use the RTK-assisted GNSS location of the client device to distinguish the client device from other client devices in the particular geographic area, and
wherein the peer-to-peer connection is a separate communication channel from the advertisement channel;
initiate, based on the peer-to-peer connection being established, a transaction
receive a payment request from the merchant device via the peer-to-peer connection,
wherein the payment request is associated with the transaction;
transmit, based on receiving the payment request, payment information to a transaction platform via a connection other than the peer-to-peer connection,
wherein the payment information is associated with the transaction;
receive, based on transmitting the payment information, information identifying a transaction confirmation associated with the transaction,
wherein the information identifying the transaction confirmation is received from the merchant device via the peer-to-peer connection; and
display the information identifying the transaction confirmation.

16. The non-transitory computer-readable medium of claim 15, wherein the one or more instructions, when executed by the one or more processors, further cause the one or more processors to:
establish the peer-to-peer connection based on receiving the peer-to-peer connection request.

17. The non-transitory computer-readable medium of claim 16, wherein the one or more instructions, that cause the one or more processors to establish the peer-to-peer connection, cause the one or more processors to:
decrypt the peer-to-peer connection request using a secret key associated with the client device and the merchant device;
determine whether data, included in the peer-to-peer connection request, decrypted into an expected format; and
establish the peer-to-peer connection based on determining that the data, included in the peer-to-peer connection request, decrypted into the expected format.

18. The non-transitory computer-readable medium of claim 15, wherein the one or more instructions, that cause the one or more processors to broadcast the location information, cause the one or more processors to:
broadcast the location information via at least one of:
a Bluetooth low energy (BLE) advertisement channel,
a Wi-Fi channel, or
a cellular network.

19. The non-transitory computer-readable medium of claim 18, wherein the peer-to-peer connection is via at least one of:
a Bluetooth low energy (BLE) non-advertisement channel,
a Wi-Fi direct channel, or
a cellular sidelink channel.

20. The non-transitory computer-readable medium of claim 15, wherein the one or more instructions, when executed by the one or more processors, further cause the one or more processors to:
transmit, to the merchant device and via the peer-to-peer connection, information associated with the transaction; and
receive, based on transmitting the information associated with the transaction, the payment request from the merchant device via the peer-to-peer connection.

* * * * *